US 12,520,036 B2

United States Patent
Arkesteijn et al.

(10) Patent No.: US 12,520,036 B2
(45) Date of Patent: Jan. 6, 2026

(54) FACE IMAGING DEVICE COMPRISING A CASING DEFINING AN OPENING FOR A FACE OF A PERSON TO BE IMAGED, WHEREIN IN THE INTERIOR OF THE CASING LIGHT SOURCES AND REFLECTORS ARE ARRANGED

(71) Applicant: SYMAE TECHNOLOGIES HOLDING B.V., Eindhoven (NL)

(72) Inventors: Walter Arkesteijn, Eindhoven (NL); Eilien Knook, Eindhoven (NL); Arnoud Robin Van Halen, Eindhoven (NL)

(73) Assignee: SYMAE TECHNOLOGIES HOLDING B.V., Eindhoven (NL)

( * ) Notice: Subject to any disclaimer, the term of this patent is extended or adjusted under 35 U.S.C. 154(b) by 314 days.

(21) Appl. No.: 17/795,125

(22) PCT Filed: Jan. 27, 2021

(86) PCT No.: PCT/NL2021/050046
§ 371 (c)(1),
(2) Date: Jul. 25, 2022

(87) PCT Pub. No.: WO2021/154071
PCT Pub. Date: Aug. 5, 2021

(65) Prior Publication Data
US 2022/0385806 A1 Dec. 1, 2022

(30) Foreign Application Priority Data
Jan. 29, 2020 (NL) ...................................... 2024783

(51) Int. Cl.
*A61B 5/00* (2006.01)
*G06V 40/16* (2022.01)
(Continued)

(52) U.S. Cl.
CPC ........... *H04N 23/64* (2023.01); *A61B 5/0077* (2013.01); *G06V 40/16* (2022.01); *G09G 1/007* (2013.01);
(Continued)

(58) Field of Classification Search
None
See application file for complete search history.

(56) References Cited

U.S. PATENT DOCUMENTS 7,804,983 B2 * 9/2010 Steinberg ............... H04N 23/64
382/118
2003/0067545 A1 4/2003 Giron et al.
(Continued)

FOREIGN PATENT DOCUMENTS

| EP | 1736098 A1 | 12/2006 |
|---|---|---|
| EP | 3226068 A1 * | 10/2017 |
| JP | 2009000494 A * | 1/2009 |

OTHER PUBLICATIONS

STIC provided Machine Translation of JP2009-000494A (Year: 2009).*

(Continued)

*Primary Examiner* — Tyler W. Sullivan
(74) *Attorney, Agent, or Firm* — Suiter Swantz IP

(57) ABSTRACT

The invention relates to a face imaging device comprising a casing defining an opening for a face of a person to be imaged, wherein in the interior of the casing light sources and reflectors are arranged. The invention further relates to a method for taking images of a face of a person using the device and to the use of the device.

10 Claims, 5 Drawing Sheets

(51) Int. Cl.
*G09G 1/00* (2006.01)
*H04N 23/60* (2023.01)
*G06F 3/14* (2006.01)

(52) U.S. Cl.
CPC .............. *A61B 5/441* (2013.01); *A61B 5/446* (2013.01); *G06F 3/1423* (2013.01); *G06F 2203/011* (2013.01); *G09G 2340/0492* (2013.01)

(56) References Cited

U.S. PATENT DOCUMENTS

| | | |
|---|---|---|
| 2004/0125996 A1 | 7/2004 | Eddowes et al. |
| 2009/0059028 A1 | 3/2009 | Kollias et al. |
| 2015/0332459 A1* | 11/2015 | Znamenskiy ............. G06T 7/80 |
| | | 348/136 |
| 2016/0156840 A1 | 6/2016 | Arai et al. |
| 2021/0192759 A1* | 6/2021 | Lang ....................... A61B 34/10 |
| 2021/0290053 A1* | 9/2021 | Tran ................... G02B 27/0093 |

OTHER PUBLICATIONS

International Search Report mailed Mar. 31, 2021 for PCT/NL2021/050046.

\* cited by examiner

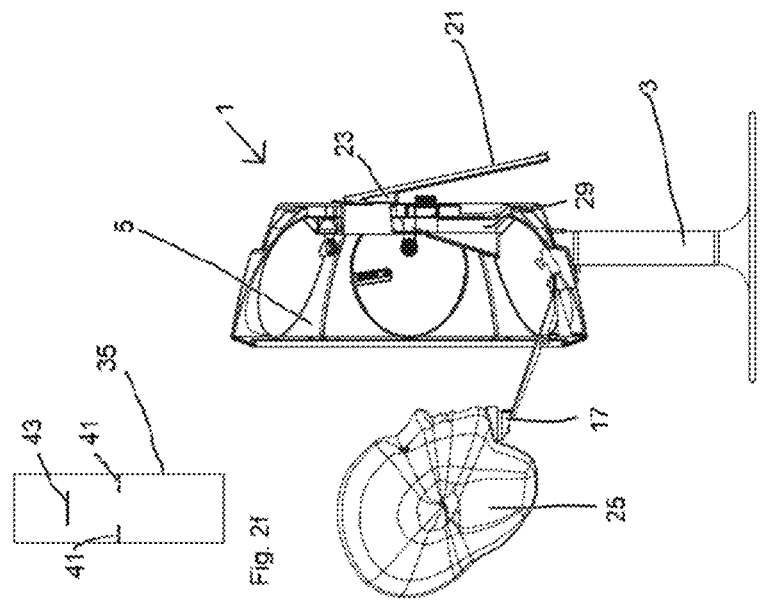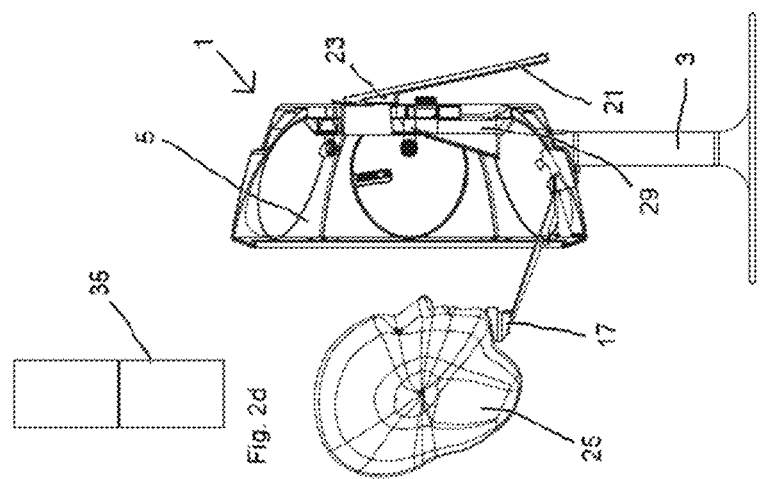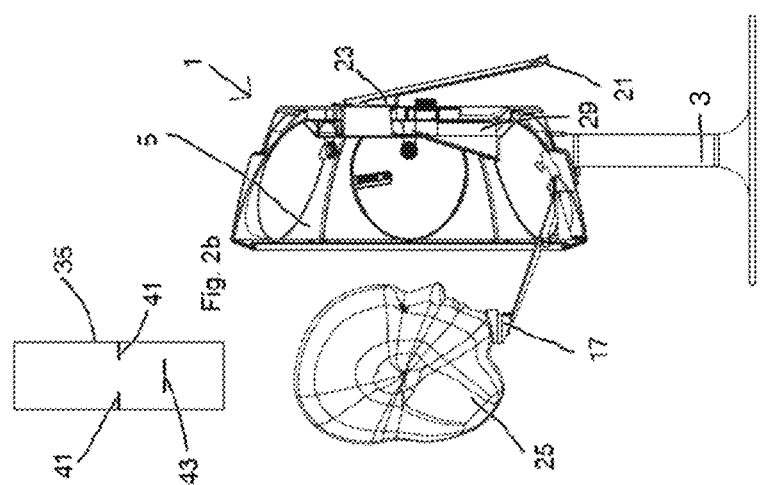

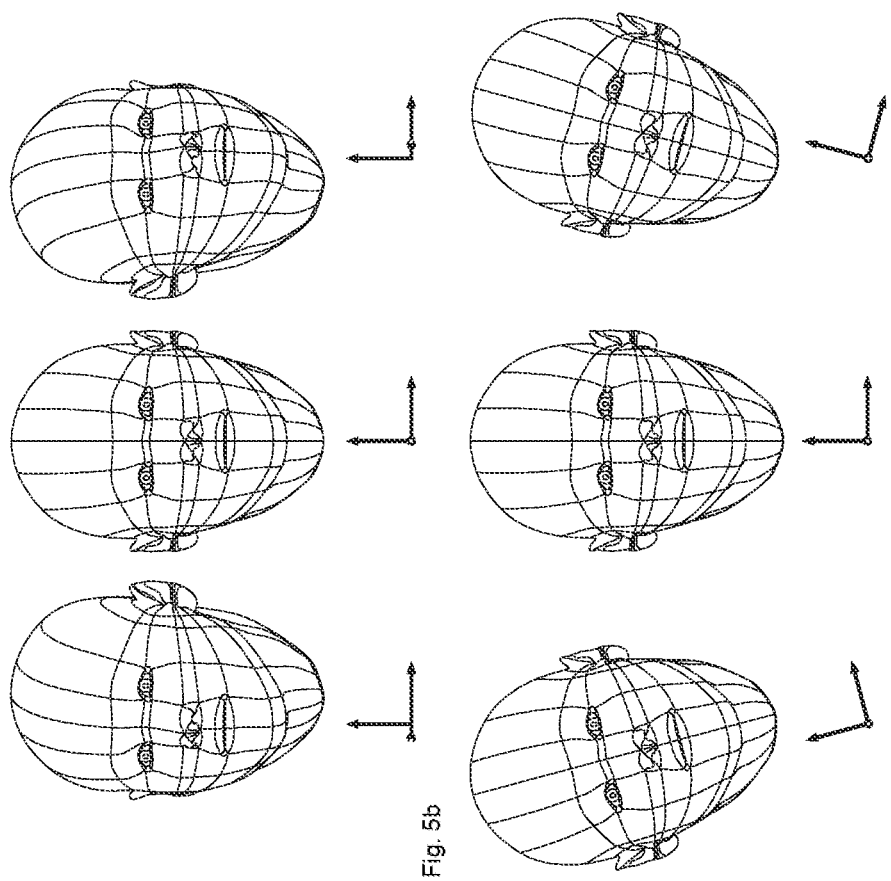
Fig. 5b
Fig. 5c
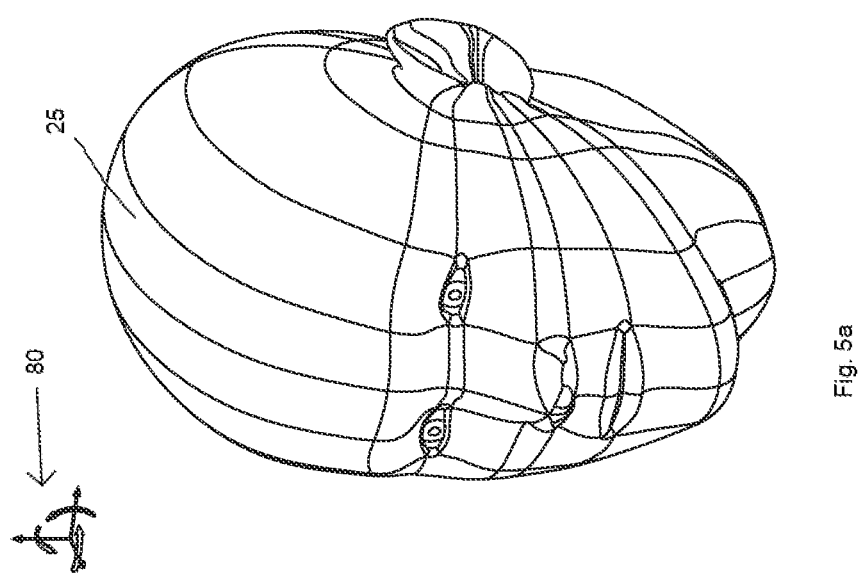
Fig. 5a

FACE IMAGING DEVICE COMPRISING A CASING DEFINING AN OPENING FOR A FACE OF A PERSON TO BE IMAGED, WHEREIN IN THE INTERIOR OF THE CASING LIGHT SOURCES AND REFLECTORS ARE ARRANGED

TECHNICAL FIELD AND BACKGROUND

The invention relates to a face imaging device comprising a casing defining an opening for a face of a person to be imaged, wherein in the interior of the casing light sources and reflectors are arranged.

EP 1 736 098 A1 discloses a face imaging device capable of imaging a face. The known device comprises a face holding mechanism provided for holding the face as an object at a focused focal point of an imaging camera of the device by a head support member adjustable for forward-to-backward and vertical positions by abutment against a region on head top side of the face inserted in a casing of the device and a jaw-rest for regulating the position of a jaw in accordance with the imaging direction such that the front side of the face and the right and left cheeks oppose to the imaging camera. In the known device it is not possible to obtain an image of the complete face of a person as a result of head support member positioned against a region on head top side of the face. In addition, it is relatively difficult for a user of the known device using the head support member to reproduce a standardized face positioning in an image of a face, or at least it is relatively difficult to do so in a relatively fast manner.

BRIEF SUMMARY

It is an object of the present invention to obtain an improved imaging device for taking an image of a face of a person with standardized face positioning. This object is obtained by a face imaging device as defined in the claims. The face imaging device comprises a casing defining an opening for a face of a person to be imaged. In the interior of the casing light sources, reflectors, at least one sensor for determining a face orientation of the face and at least one display are arranged to show the person a desired face orientation and the actual face orientation of the face determined by the at least one sensor such that the person is able to position his/her face in the desired face orientation for taking at least one image of the face.

The sensor has the advantage with respect to a head support member that an image of a relatively large part of the face, the complete face or almost the complete face can be taken. Further, by using the display showing a person the desired face orientation and the actual face orientation of the face determined by the sensor, an image of the face of the person with standardized face positioning can be obtained in a relatively user friendly manner and/or in a relatively fast manner.

Using a corresponding face orientation of the face in for example a first and a second image to be taken by the face imaging device guarantees an improved comparison quality between the images. The sensor in the device also allows to use a first device to obtain a first image and to use a second similar face imaging device on a different location to take a second image to be compared with the first image. For example, it is possible to compare the effects of a skin treatment performed on the face between the first and the second image. Even a minimal difference in face orientation may have a relatively big impact on the images obtained by the face imaging device(s) for comparison. For example, light provided under identical lighting conditions by the light sources of the device will fall on the skin of the face to be imaged under a different angle if the face orientation in the images to be compared is minimally different, which makes it difficult or even impossible to compare images of a single person with each other or an image of a person with a representative standard image for an average person. Further, by using the input of the sensor shown on the display for obtaining the standardized image, it is possible to obtain the desired image(s) for comparison in a relatively fast manner without requiring difficult manual adjustments to the device by a user, for example an operator. The sensor may for example be a proximity sensor to measure the distance between the sensor and a face of a person or, alternatively or in addition, the sensor may use vertical cavity surface-emitting laser (VCSEL) technology, i.e. a sensor for 3D sensing to determine the face orientation in a relatively accurate manner. Other image sensors for determining at least one degree of freedom of a person's face may also be used in the device for determining a face orientation of a person's face.

In one aspect, a face orientation of a first image of a person's face determined by the at least one sensor may be stored in a computer storage unit of the device as the desired face orientation, wherein the face imaging device comprises a processor configured to access the computer storage unit and to display the desired face orientation of the face in the display to obtain a second image of the person's face, such that the first image and the second image have a corresponding face orientation of the person's face. Using the face orientation of a first image of a person's face to obtain the desired face orientation to take the second image makes an accurate comparison of the two images possible. Hence, in this aspect the face orientation of the face in the first image to be taken is less important, because the face orientation of the first image is used as the reference/desired face orientation to be shown in the display. Once, the device has stored the reference/desired face orientation, the second image of the same face can be taken if the face has a corresponding face orientation shown in the display as in the first image. Hence, for comparison purposes, the at least two images having the corresponding face orientation of the face may be taken in a relatively fast manner by means of the sensor and the display showing the desired face orientation determined by the sensor in the first image and the actual face orientation. In addition, minimal alignment measures for taking the first image have to be carried out, as the face orientation in the first image becomes the reference/desired face orientation to take the second image.

The face imaging device may further be configured for taking under substantially identical imaging conditions images of at least one face, for example at least a first image of the face and at least a second image of the same face after skin treatment of the face. Preferably, light sources of the face imaging device are configured to provide at least two face observation modes, for example a first mode using UV radiation to make a diagnostic observation and a second mode to make a daylight observation. The substantially identical imaging conditions between the at least two images to be compared may be provided by using the light sources in the same face observation mode and/or by using a shield shielding off environmental light in combination with the casing.

In another aspect, the display is configured to show a fixed predetermined face orientation of the face and a face orientation of the face determined by the at least one sensor. The fixed predetermined face orientation may be represented by a fixed value or values programmed and stored in the device by the manufacturer of the face imaging device. Alternatively, fixed predetermined face orientation may be adjusted by an operator if desired before taking one or a number of images with standardized face orientation.

In a further aspect, the face imaging device may comprise a processor configured to compare the desired face orientation of the face with a face orientation of the face determined by the at least one sensor, wherein the processor is configured to enable the face imaging device to take the image if the face orientation of the face determined by the at least one sensor corresponds to the desired face orientation of the face. By permitting to take an image by the device if the face orientation of the face determined by the at least one sensor corresponds to the desired face orientation of the face, it is impossible that an incorrect decision is taken by a user of the device, i.e. the device prohibits taking an image in which the actual face orientation does not correspond to the desired face orientation. The processor may further be configured to instruct the face imaging device to automatically take the image if the face orientation of the face determined by the at least one sensor corresponds to the desired face orientation of the face. In this configuration the image or images will be automatically taken by the device, when the processor has established that the face orientation of the face determined by the at least one sensor corresponds to the desired face orientation. The display then assists the person to move his/her person's head in the correct direction or directions in a relatively fast manner. Automatically capturing the face by the device reduces the risk of misalignments between a first image and a second image and may further improve the quality of the images to be compared.

The display may have a user interface for facilitating the correct and accurate positioning of the face for taking standardized images of the face. The display, in particular the user interface, may be configured to show a symbol, for example a line, representing at least one degree of freedom of the head of the person, wherein the symbol corresponds to the at least one degree of freedom of the actual face orientation determined by the sensor which is to aligned with the desired face orientation, for example a horizontal or a vertical orientation of the line. Other obvious orientations of the symbol, other than a vertical or horizontal line, may also be used for the desired face orientation. Alternatively, the display may be configured to show at least two associated symbols, for example two associated lines, representing at least one degree of freedom of the head of the person, wherein one of the two associated symbols corresponds to the at least one degree of freedom of the desired face orientation and the other of the two associated symbols corresponds to the same degree(s) of freedom of the actual face orientation determined by the sensor. By moving his/her head in the at least one degree of freedom indicated by the two associated symbols, a user intuitively is able to position his head/face in the desired face orientation in a relatively accurate and fast manner, wherein as soon as the associated symbols coincide or align the standardized image may be taken. The display may be configured to show additional symbols, wherein each symbol represents one or two further degrees of freedom. In other words, it is possible to show a person of whose face images should be taken between one and six degrees of freedom, preferably between one and three degrees of freedom, on the display to obtain a standardized image with the desired face orientation. The desired face orientation may be defined by one to six degree(s) of freedom, preferably between one and three degrees of freedom.

The face imaging device may comprise a fixed camera or a camera holding unit for holding a camera in a releasable manner in a predetermined position in the device to provide the at least one standardized image of the face to be compared, preferably the camera to be positioned in the camera holding unit is a camera of a tablet computer or a smartphone.

Further, the device may be a portable device. Hence, it is possible to use the relatively compact and lightweight device on various locations.

The casing may comprises at least three spaced apart sensors for determining the actual face orientation of the face. Using more than one sensor may increase the accuracy of the face imaging device. Further, the casing may comprises three displays. In the casing each display and each sensor may form a unit. In the device three units are provided, i.e. two outer units and one central unit, wherein the central unit may be provided with a viewing hole for a camera. If a shell-like casing with a face opening is being used in the face imaging device, displays near an edge of the opening of the shell-like casing are preferred such that a person is able to easily see the display when a right or left side view of the face should be imaged to position his/her head in the position indicated by the display. If the device is provided with three displays, it is possible to switch off one or two displays. Hence, the active (switched on) display provides a relatively user-friendly indication to the person what kind of image should be taken, i.e. an image of the right or left side face or a front image of the complete or almost complete face of the person.

In addition, the face imaging device may comprise at least a support for supporting a portion of a person's head to restrict head movement in three degrees of freedom, wherein the sensor is configured to use a portion of the person's head or face spaced apart from the support for determining the face orientation of the face to obtain the at least one image, wherein the face orientation in the image is identical with the desired face orientation in at least four degrees of freedom of the person's head. The support may be a chin support. The chin support may be arranged to support the chin of the person to obtain front view of the face and at least two side views of the face.

The invention further relates to a method for taking images of a face of a person using the device as defined in this document, in particular the method is used for diagnosing skin and/or scalp conditions. The invention also relates to the use of the device as defined in this document.

BRIEF DESCRIPTION OF THE DRAWINGS

The present invention will be explained in more detail below with reference to the appended figures showing an exemplary embodiments of a face imaging device.

FIGS. 2a-f show views of the face imaging device shown in FIG. 1, a display and a person's head in various positions;

FIG. 5a-c show various positions of a person's head with respect to the six degrees of freedom;

DETAILED DESCRIPTION

Like parts are indicated by the same reference signs in the various figures.

Each feature disclosed with reference to the figure can also be combined with another feature disclosed in this disclosure including the claims, unless it is evident for a person skilled in the art that these features are incompatible.

Figure 1A:
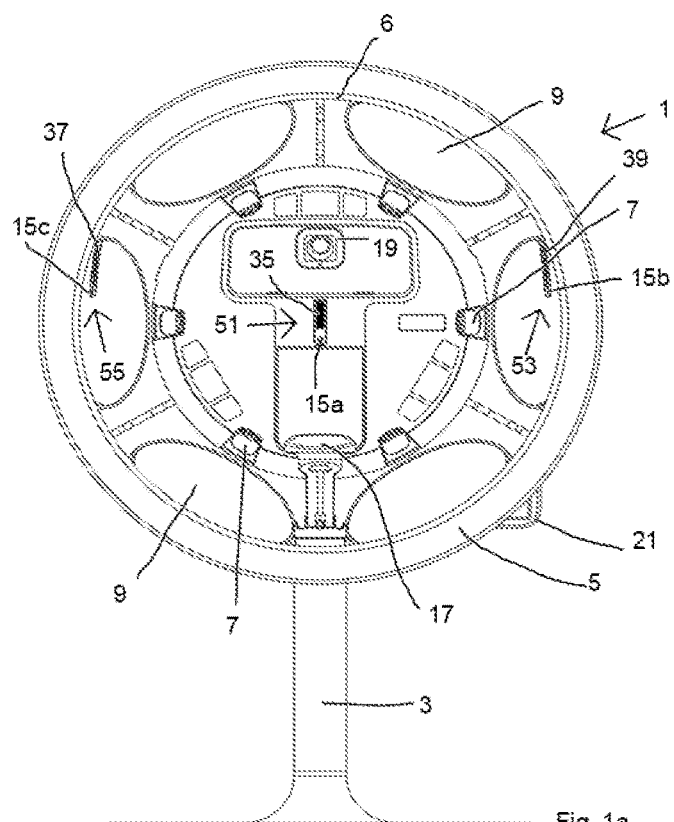
FIGS. 1a-d show views of a face imaging device.
Figure 1B:
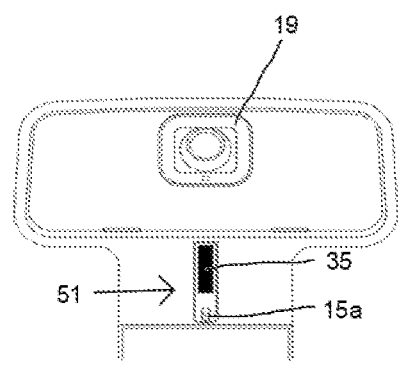
Figure 1C:
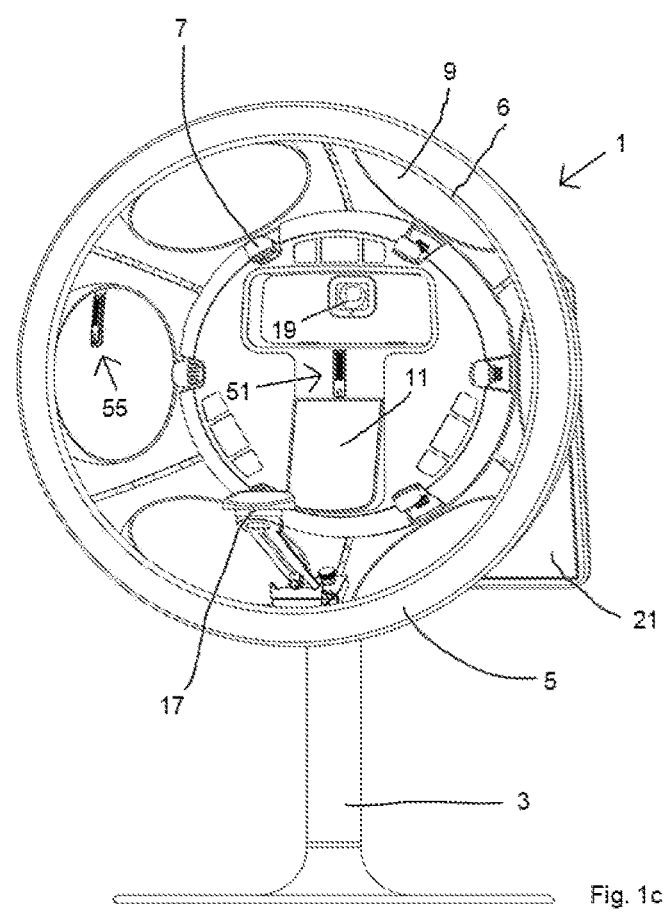
Figure 1D:
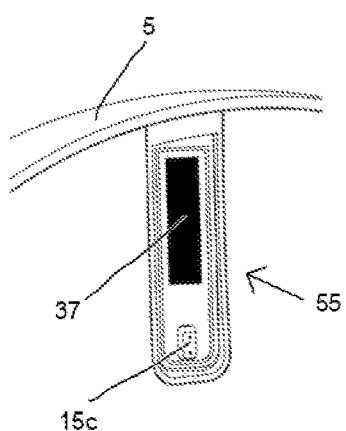

FIGS. 1a and 1c show a face imaging device 1, wherein FIGS. 1b and 1d show a detail of the device. The device 1 is a portable device comprising a base mount 3 to be placed on a support (not shown), for example a table. The device 1 comprises a casing 5 having an endless edge 6 defining an opening for a face to be imaged. In the interior of the casing 5 various light LED sources 7, reflectors 9, and a mirror 11 are arranged. The device 1 may be provided with a light shield (not shown) connected or to be connected to the casing 5 to be positioned in use around a person's head for blocking environmental light. As shown in more detail in FIGS. 1b and 1d the casing 5 comprises three sensors 15a-c for determining the actual face orientation of the face to be positioned at least partially in the opening or in front of the opening of the casing 5 on a chin support 17 of the device 1. The three sensors 15a-c comprise a central sensor 15a and two outer sensors 15b,c. The device 1 further comprises a viewing opening/hole 19 positioned near the central sensor 15a for a camera. The camera is a camera of a tablet computer 21. The face imaging device 1 may also comprise a fixed camera (not shown). The device 1 further comprises a camera holding unit 23 (FIG. 2a) for holding the camera of the tablet computer 21 in a releasable manner in a predetermined position in the device 1 to provide at least one image of the face. The light sources 7 of the face imaging device 1 are configured to provide two or more face observation modes, for example a first mode using UV radiation to make diagnostic observations and a second mode to make a daylight observation. These observations of the face can be imaged by the camera of the tablet computer 21.

The face imaging device 1 for taking images of a face of a person is configured for obtaining an image of the face of the person with standardized face positioning and/or for obtaining at least a first image of the face and at least a second image of the same face for comparison, for example to compare the effects of a skin treatment performed on the face between the at least one first and the at least one second image, preferably the first and second image are taken under substantially identical conditions, for example substantially identical light conditions. At least one of the sensors 15a-c determines a face orientation of the face as shown in FIGS. 2a-f, i.e. at least one of the sensors 15a-c determines at least one degree of freedom of a person's head 25. In addition, the chin support 17 for supporting a chin of a person's head 25 restricts head movement in three (of the total of six, see FIG. 5) degrees of freedom. The sensors 15a-c are configured to use a portion of the person's head or face, for example a portion of the fore head to determine at least one of the three degrees of freedom not restricted by the chin support 17. The sensors 15a-c may also determine more than one degree of freedom, for example two or three degrees of freedom as will be discussed below with reference to FIG. 6.

As shown in FIGS. 1a-d, 2a-f, the face imaging device 1 comprises three displays 35, 37, 39 arranged in the interior of the casing to show the person a desired face orientation, indicated by the symbols/lines 41 on the display 35 (FIGS. 2b, 2d, 20, and the actual face orientation of the face determined by the sensor 15a and indicated on the display 35 by the symbol/line 43 such that the person is able to position his/her face in the desired face orientation. In the device one display 35, 37, 39 and one sensor 15a-c are arranged in one unit 51, 53, 55 (FIG. 1a-d), i.e. a central unit 51 and two outer units 53, 55. In FIG. 2a the person's head is in the incorrect position as shown in the display 35 presented in FIG. 2b. By moving his/her head upwards, the symbol/line 43 moves upwards for example to a position as shown in FIG. 2f. Then, by moving his/her head downwards the symbol/line 43 can be aligned with the symbols/lines 41 as shown in FIG. 2d which corresponds with the position of the person's head as shown in FIG. 2c, in which position the camera of the tablet computer 21 may take the image of the face of the person positioned in or near the opening of the casing to obtain an image of the face with standardized face positioning. The displays 35, 37, 39 may have an identical user interface. The user interface as shown in the FIGS. 2a-2f and 6 facilitates the correct positioning of the face for taking the image of the face with standardized face positioning. The display 35, 37, 39 is configured to show at least two associated symbols/lines 41, 43, representing at least one degree of freedom of the head of the person, wherein one 41 of the two associated symbols corresponds to the at least one degree of freedom of the desired face orientation and the other 43 of the two associated symbols corresponds to the at least one degree of freedom of the actual face orientation determined by at least one of the sensor 15a-c. By moving his/her head between positions as shown in FIGS. 2a,c,e in the at least one degree of freedom indicated by the two associated symbols 41, 43, a user intuitively is able to position his head/face in the desired face orientation in a relatively accurate manner, i.e. as soon as the associated symbols/lines 41, 43 coincide or align an image can be taken, wherein in the position of the person's head shown in FIGS. 2c and 2d an image may be taken to obtain the image of the face with standardized face positioning. In other words, the displays 35, 37, 39 inside the casing 5 of the device 1 are arranged to show the person a desired face orientation and the actual face orientation of the face determined by the at least one sensor 15a-c such that the person is able to position his/her face in the desired face orientation for taking at least one image of the face.

The device 1 further comprises a processor 29 (FIGS. 2a, 2c, 2e) configured to use the face orientation of the face determined by at least one of the sensors 15a-c to permit the device to obtain the image of the face with standardized face positioning if the face orientation of the face determined by the at least one sensor 15a-c corresponds to the desired face orientation of the face.

The processor 29 may be configured to communicate with the camera of the tablet computer 21 to instruct the camera to automatically take the image if the face orientation of the face determined by the at least one sensor corresponds to the desired face orientation of the face. Further, by automatically obtaining the second image, the face imaging device 1 itself provides the image of the face without the risk that an operator or the person himself makes an image which has a different face orientation than the desired face orientation.

In the embodiment of the device and the display 35 as shown in FIGS. 2a-f, the face orientation in each image of at least two images of the face to be taken by the device for comparison purposes is identical in at least four degrees of freedom to compare the first and second images for example for showing progress of a face skin treatment and/or for diagnosing skin and/or scalp conditions. Using this corresponding face orientation of the face in the first and the second image guarantees an improved comparison quality, wherein external effects can be reduced significantly. Further, identical lighting conditions between the at least two images to be compared may be preferred by using the light sources 7 in the same face observation mode and/or by using a shield shielding off in combination with the casing 5 environmental light or other external influences.

Figure 3:
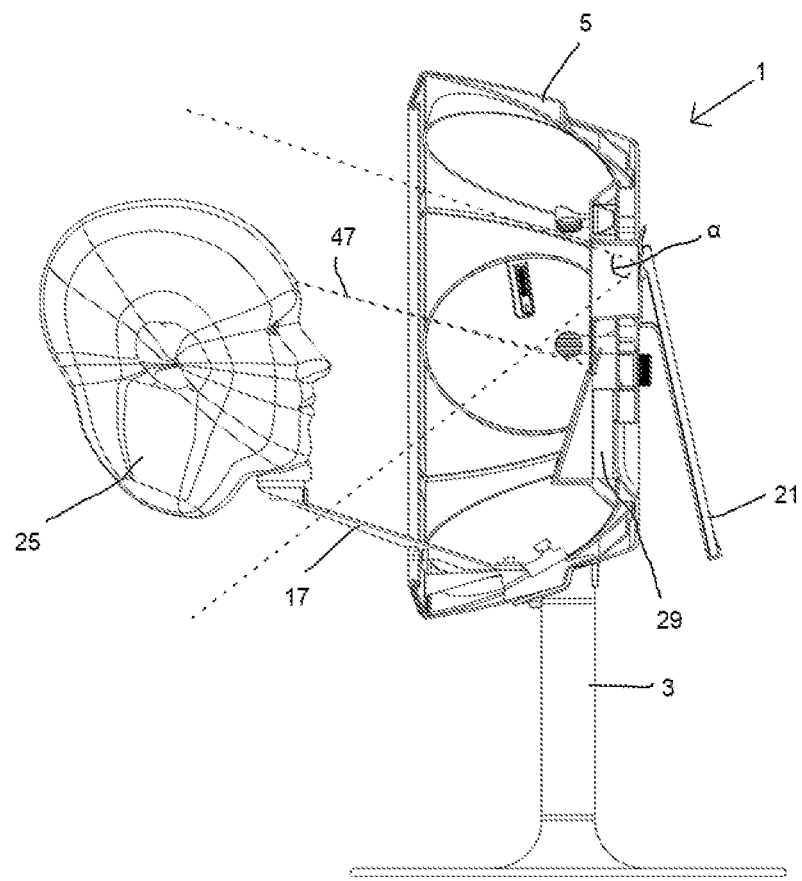
FIG. 3 shows a view of the face imaging device shown in FIG. 1 in combination with a person's head.
Figures 4A, 4B:
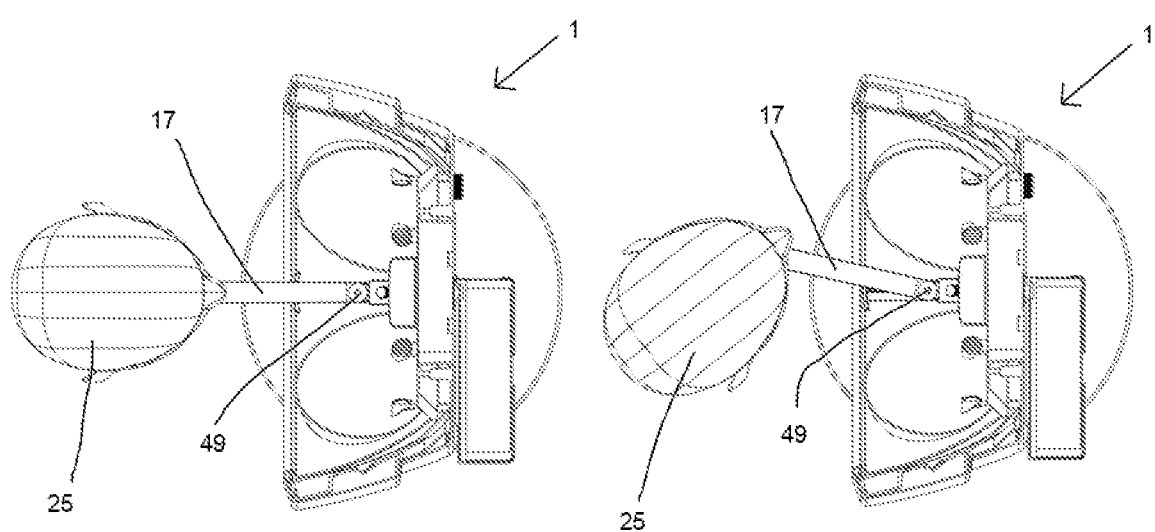
FIGS. 4a,b show top views of the face imaging device.

FIG. 3 shows the vertical viewing angle α of the camera of the tablet computer 21 and the viewing direction 47 of the sensor 15a to determine the face orientation of the face of the person's head 25. As shown in FIGS. 4a and 4b the chin support is pivotably connected about a pivot 49 to the device 1 to permit the chin support to move to a different position for taking images of the side face of the face of the person's head 25.

FIG. 5a-c show a person's head in various position, in particular the movement of the person's head in the fifth degree of freedom in FIG. 5b and the sixth degree of freedom in FIG. 5c. The arrows 80 show all the six degrees of freedom of a person's head.

Figure 6:
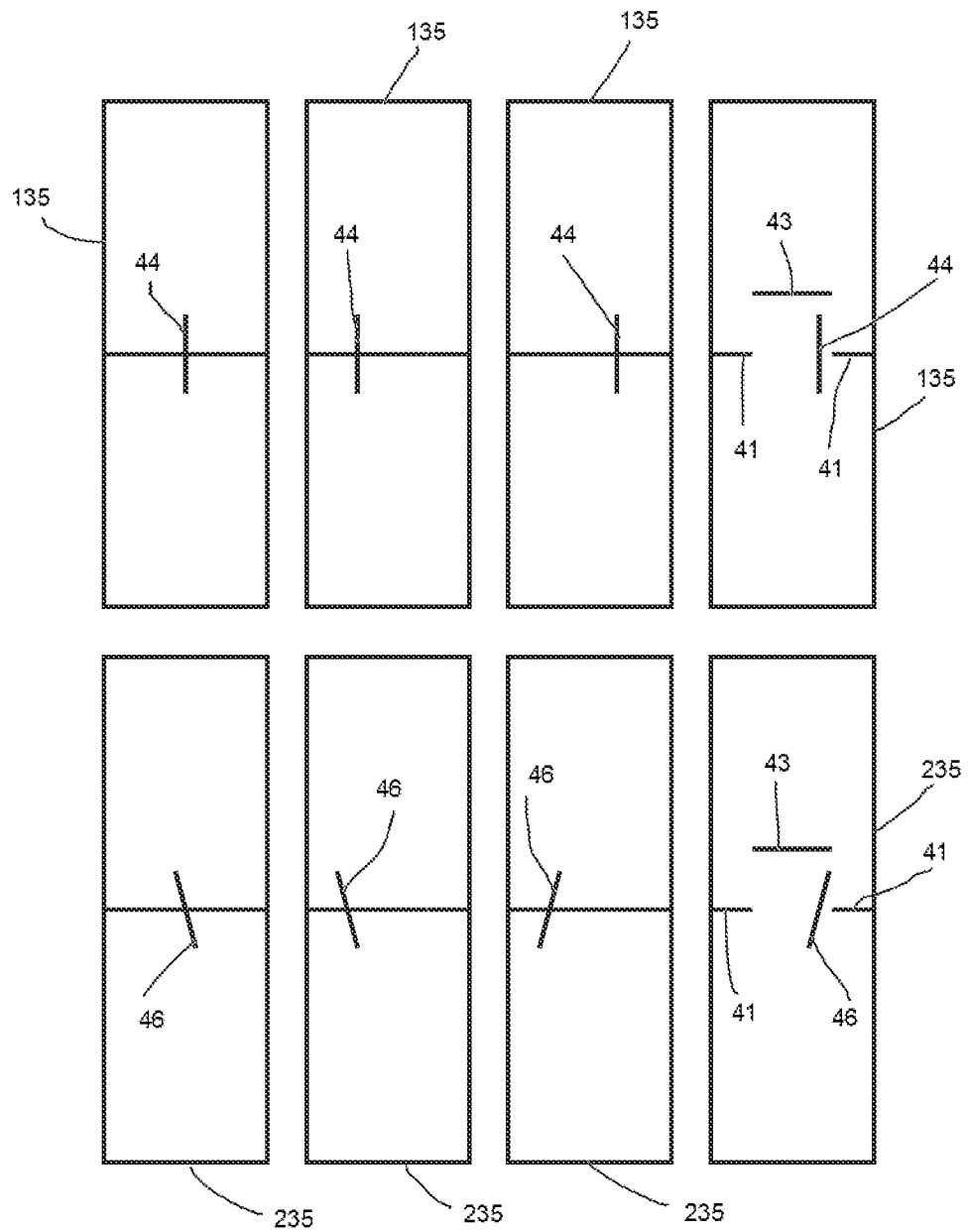
FIG. 6 shows another embodiment of a display of the face imaging device.

FIG. 6 shows that the display may be configured to show additional symbols, wherein each symbol represents one or two further degrees of freedom, for example a second visualization mode of a display 135 and a third visualization mode of a display 235, wherein in the second visualization mode of the display 135 two degrees of freedom are captured/detected by the sensor 15a and shown on the display in real time, whereas in the third visualization mode of the display 235 three degrees of freedom are captured/detected by the sensor 15a and shown on the display 135, 235 in real time. In addition, to the variable symbol/line 43 representing one (fourth) degree of freedom, the display 135 also shows another variable symbol/line 44 which represents a further (fifth) degree of freedom of a person's head as shown for example in FIG. 5b, wherein the display 235 shows an additional variable symbol/line 46 which besides the further (fifth) degree of freedom represents an additional (sixth) degree of freedom of a person's head as shown in FIG. 5c. The display 135, 235 is configured to show additional symbols, wherein each symbol represents one or two further degrees of freedom. In other words, it is possible with the display to show a person of whose face images should be taken between one and three degrees of freedom to obtain the image of the face of the person with standardized face positioning and/or to obtain at least two images having a corresponding face orientation. The corresponding face orientation in the at least one first and the at least one second image may vary between having four corresponding degrees of freedom in the two images to be compared and up to six corresponding degrees of freedom in the two images to be compared. The symbol/line 46 is configured to rotate around its center and to move from right to left, whereas the symbol/line 44 is configured to move from the right to the left only. The upper left display 135 in FIG. 6 shows a position of a person's head which has the desired face orientation to take an image of his/her face.

By means of the face imaging device 1, it is also possible to store a face orientation of a first image of a person's face determined by the at least one sensor in a computer storage unit (not shown) of the device 1 as the desired face orientation, wherein the face imaging device comprises the processor 29 configured to access the computer storage unit and to display the desired face orientation of the face in the display to obtain a second image of the person's face, such that the first image and the second image have a corresponding face orientation of the person's face. Such a desired face orientation which may change during various imaging sessions may be represented in the display 35, 135, 235 as symbol/line 41.

In an embodiment of the face imaging device not shown in the figures, it is also possible to use the camera of the device or the camera of the tablet computer 21 attached to the device as the sensor for determining a face orientation of the face, i.e. such a the face imaging device does not require the sensors 15a-c. The camera in such an embodiment is configured to communicate with the display arranged inside the casing to show the person a desired face orientation and the actual face orientation of the face determined by the at least one sensor such that the person is able to position his/her face in the desired face orientation for taking at least one image of the face. The face imaging device may also comprises at least two sensors, wherein each sensor uses different technology to determine a face orientation of the face.

The face imaging device may also use a desired face orientation which is a fixed predetermined face orientation of the face. The fixed predetermined face orientation may be a fixed value or values programmed and stored in the device by the manufacturer of the face imaging device or may be adjusted by an operator if desired before taking an image with the device. The fixed predetermined face orientation may be represented in the display 35, 135, 235 as symbol/line 41.

After taking the standardized image it is possible to use software, for example provided on the tablet computer, to analyze the images and to compute the differences between the images and/or emphasize the differences in the image and for example an standard image or between images taken by the device 1 to be shown to a user for example an operator or the person whose face has been imaged. Further, it is possible that the display 35, 135, 235 of the device 1 serves to position the face to be imaged in the desired face orientation, wherein software on the tablet computer 21 communicating with the processor also shows the actual face orientation and the desired face orientation in a tablet computer's display such that an operator of the tablet computer 21 may provide instruction by means of the tablet computer 21 to take the standardized image of a face of a person.

The invention claimed is:

1. A face imaging device, comprising:
a casing defining an interior and an opening for receiving a face of a person to be imaged;
at least one light source disposed in the interior;
at least one reflector disposed in the interior;
at least one sensor disposed in the interior, the at least one sensor configured to determine a face orientation; and
at least one display disposed in the interior, the at least one display configured to display a desired face orientation and an actual face orientation determined by the at least one sensor such that the face is positionable in the desired face orientation to capture at least one image of the face;
wherein:
a face orientation of a first image determined by the at least one sensor is stored in a memory of the face imaging device as the desired face orientation;
the face imaging device comprises a processor configured to access the memory and to display the desired face orientation in the at least one display to obtain a second image of the face such that the first image and the second image have a corresponding face orientation;

the processor is configured to display, by the at least one display, a plurality of symbols representing degrees of freedom of the desired face orientation and the actual face orientation, wherein the plurality of symbols comprise at least one fixed symbol representing at least one degree of freedom of the desired face orientation and at least one symbol configured to rotate and move horizontally to represent at least two degrees of freedom of the actual face orientation in real time; and the processor is configured to obtain the second image of the face when the plurality of symbols representing the degrees of freedom of the desired face orientation and the actual face orientation are aligned.

2. The face imaging device according to claim 1, wherein the desired face orientation is a fixed predetermined face orientation of the face.

3. The face imaging device according to claim 1, wherein the two associated symbols are lines.

4. The device according to claim 1, further comprising a camera holder configured to releasably hold a camera in a predetermined position to capture the image of the face.

5. The device according to claim 1, wherein the face imaging device is portable.

6. The face imaging device according to claim 1, wherein the at least one sensor comprises a central sensor positioned between two outer sensors.

7. The face imaging device according to claim 1, wherein the at least one display comprises a central display positioned between two outer displays.

8. The face imaging device according to claim 1, further comprising a support configured to support a head and restrict head movement in three degrees of freedom.

9. The face imaging device according to claim 8, wherein the support is a chin support.

10. The face imaging device according to claim 9, wherein the chin support is configured to support the chin to obtain a front view image of the face and at least two side view images of the face.

\* \* \* \* \*